US012609315B2

(12) United States Patent
Yabe et al.

(10) Patent No.: US 12,609,315 B2
(45) Date of Patent: *Apr. 21, 2026

(54) SOLID-STATE BATTERY

(71) Applicant: Panasonic Intellectual Property Management Co., Ltd., Osaka (JP)

(72) Inventors: Hiroki Yabe, Aichi (JP); Hiroki Kamitake, Osaka (JP); Yusuke Ito, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 504 days.

This patent is subject to a terminal disclaimer.

(21) Appl. No.: 18/059,758

(22) Filed: Nov. 29, 2022

(65) Prior Publication Data

US 2023/0093244 A1     Mar. 23, 2023

Related U.S. Application Data

(63) Continuation of application No. PCT/JP2021/014411, filed on Apr. 2, 2021.

(30) Foreign Application Priority Data

Jun. 2, 2020     (JP) ................................. 2020-096419

(51) Int. Cl.
*H01M 4/587* (2010.01)
*H01M 4/02* (2006.01)

(52) U.S. Cl.
CPC ...... *H01M 4/587* (2013.01); *H01M 2004/027* (2013.01); *H01M 2300/008* (2013.01)

(58) Field of Classification Search
CPC ........... H01M 4/587; H01M 2300/008; H01M 2400/027; H01M 4/02; H01M 2004/021; H01M 2004/023
See application file for complete search history.

(56) References Cited

U.S. PATENT DOCUMENTS

2010/0012403 A1* 1/2010 Fujita .................. H01M 10/052
429/231.95
2016/0006020 A1     1/2016 Tamaki et al.
(Continued)

FOREIGN PATENT DOCUMENTS

EP          3168909 A1     5/2017
JP      H108-195219 A     7/1996
(Continued)

OTHER PUBLICATIONS

Chinese Search Report dated May 26, 2025 issued in the corresponding Chinese Patent Application No. 202180034052.9, with English translation.

(Continued)

*Primary Examiner* — Marla D Mcconnell
*Assistant Examiner* — Olivia A Jones
(74) *Attorney, Agent, or Firm* — Rimon P.C.

(57)     ABSTRACT

A solid-state battery of the present disclosure includes: a negative electrode layer including a negative electrode active material; a positive electrode layer; a solid electrolyte layer positioned between the positive electrode layer and the negative electrode layer. The negative electrode active material includes: a graphite particle being an aggregate of a plurality of primary particles including graphite, the graphite particle having a void inside; and a solid electrolyte being present in the void. At least a portion of the void may be filled with the solid electrolyte. The void has a minimum diameter of, for example, 1 nm or more and 70 nm or less.

12 Claims, 5 Drawing Sheets

(56) References Cited

U.S. PATENT DOCUMENTS

| | | | | |
|---|---|---|---|---|
| 2016/0013479 A1* | 1/2016 | Iwasaki | ............... | H01M 4/0402 |
| | | | | 429/305 |
| 2018/0226677 A1* | 8/2018 | Nishiura | ............... | H01M 4/364 |
| 2019/0165357 A1 | 5/2019 | Senoue | | |
| 2019/0334162 A1 | 10/2019 | Kurita et al. | | |
| 2020/0136144 A1 | 4/2020 | Tamura et al. | | |
| 2020/0411843 A1* | 12/2020 | Song | ..................... | H01M 4/133 |
| 2021/0184218 A1* | 6/2021 | Ahn | ...................... | H01M 4/364 |
| 2021/0265665 A1* | 8/2021 | Kim | ...................... | H01M 4/622 |

FOREIGN PATENT DOCUMENTS

| | | | |
|---|---|---|---|
| JP | 2014-203545 | A | 10/2014 |
| JP | 2017-010936 | A | 1/2017 |
| JP | 2018-097982 | A | 6/2018 |
| JP | 2018-107145 | A | 7/2018 |
| JP | 2019-016484 | A | 1/2019 |
| JP | 6683363 | B2 | 4/2020 |
| JP | 2020-071959 | A | 5/2020 |
| JP | 2020-080285 | A | 5/2020 |
| KR | 20190044397 | A | 4/2019 |
| WO | 2018/110386 | A1 | 6/2018 |
| WO | 2019/078702 | A1 | 4/2019 |
| WO | 2019/226020 | A1 | 11/2019 |

OTHER PUBLICATIONS

Dong Hyeon Kim et al., "Infiltration of Solution-Processable Solid Electrolytes into Conventional Li-Ion-Battery Electrodes for All-Solid-State Li-Ion Batteries", Nano Letters, vol. 17, 2017, pp. 3013-3020.

International Search Report issued on Jun. 22, 2021 in International Patent Application No. PCT/JP2021/014411, with English translation.

International Search Report issued on Jun. 22, 2021 in International Patent Application No. PCT/JP2021/014410, with English translation.

Extended European Search Report dated Sep. 2, 2024 issued in the corresponding European Patent Application No. 21817246.8.

Non-Final Office Action issued in corresponding U.S. Appl. No. 18/059,753, dated Nov. 13, 2025.

* cited by examiner

2000

201

202

203

1000

105

1000

101   103   102

100

SOLID-STATE BATTERY

This application is a continuation of PCT/JP2021/014411 filed on Apr. 2, 2021, which claims foreign priority of Japanese Patent Application No. 2020-096419 filed on Jun. 2, 2020, the entire contents of both of which are incorporated herein by reference.

BACKGROUND OF THE INVENTION

1. Field of the Invention

The present invention relates to a solid-state battery.

2. Description of Related Art

In all-solid-state lithium-ion batteries, both electrons and lithium ions are required to be efficiently supplied to an active material in an electrode layer. In all-solid-state lithium-ion batteries, an active material is, for example, dispersed in an electrode layer. A common negative electrode layer desirably has both an electron conduction path formed of active material particles in contact with each other and an ion conduction path formed of solid electrolytes joined to each other.

A graphite particle is sometimes used as a negative electrode active material. Graphite has a layer structure including carbon. A battery having a high capacity is achieved by a reaction in which lithium ions are inserted in or desorbed from the layer structure of graphite. However, while having electron conductivity, graphite has poor ion conductivity. In a common negative electrode layer, a graphite particle can sometimes be combined with a solid electrolyte to make up for the ion conductivity of graphite. A graphite particle can also be combined with a binder in some cases. Binders are suitable for joining particles to form films.

SUMMARY OF THE INVENTION

Solid-state batteries produced by conventional techniques are required to have improved rate characteristics.

A solid-state battery of the present disclosure includes:
a negative electrode layer including a negative electrode active material;
a positive electrode layer; and
a solid electrolyte layer positioned between the positive electrode layer and the negative electrode layer, wherein
the negative electrode active material includes:
a graphite particle being an aggregate of a plurality of primary particles including graphite, the graphite particle having a void inside; and
a solid electrolyte being present in the void.

According to the present disclosure, the solid-state battery can have improved rate characteristics.

Figure 1:
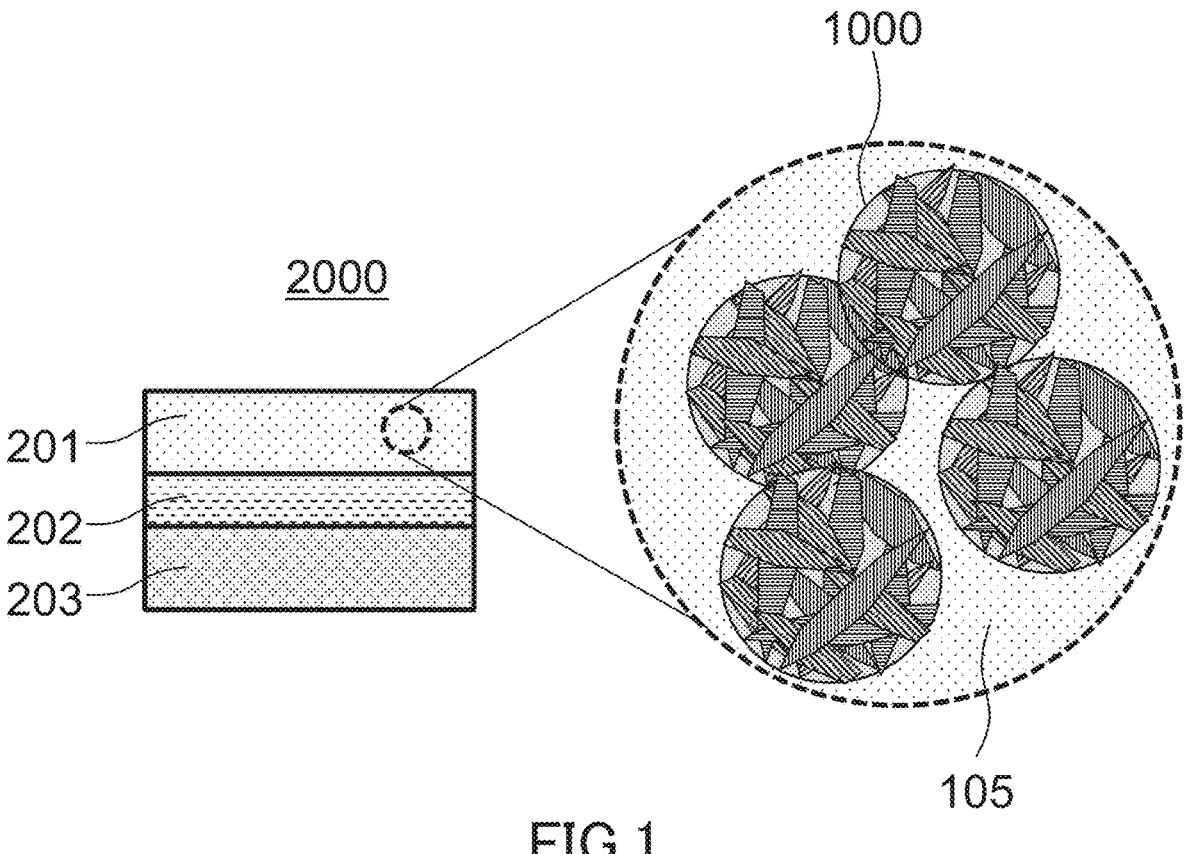
FIG. 1 is a cross-sectional view schematically showing a configuration of a solid-state battery of Embodiment 1.

DETAILED DESCRIPTION (Findings on which the Present Disclosure is Based)

In a negative electrode layer including a graphite particle and a solid electrolyte, the solid electrolyte has poor electron conductivity. Therefore, an increase in the amount of the solid electrolyte with respect to that of the graphite particle decreases a volume proportion of graphite in the negative electrode layer, decreasing the capacity of the negative electrode layer. Moreover, the increase in the amount of the solid electrolyte with respect to that of the graphite particle also prevents the graphite particles from having contact with each other to decrease the electron conductivity of the negative electrode layer. That is, when the graphite particle and the solid electrolyte are combined in the negative electrode layer, the electron conductivity and the ion conductivity are in a trade-off relationship in the negative electrode layer. In this case, improvement of the capacity of the negative electrode layer is demanded as well as maintenance of the balance between the electron conductivity and the ion conductivity.

JP H8-195219 A discloses adjustment of the average particle size of an active material, the average particle size of a solid electrolyte, and the mixing ratio between the active material and the solid electrolyte for improvement of a use rate of the active material in an electrode of a conventional all-solid-state lithium secondary battery.

JP H8-195219 A discloses adjustment of the average particle sizes of the active material and the solid electrolyte to the range of 0.1 μm or more and 50 μm or less. The average particle size of the active material may be increased within the above range to improve the capacity of a negative electrode layer. However, in that case, rate characteristics exhibited by a battery in charging and discharging decrease because of slow ion conduction inside the active material. On the other hand, a decrease in the average particle size of the active material increases the area of an outer surface of the active material. This results in an increase in the contact area between the active material and the solid electrolyte and a decrease in the electron conductivity of the negative electrode layer. An active material having a small average particle size can sometimes increase the viscosity of a coating liquid. Therefore, a disadvantage can arise in the process of production of a negative electrode layer using a coating liquid containing the active material having a decreased average particle size. As described above, it is difficult to produce a battery exhibiting excellent rate characteristics in charging and discharging by adjusting the average particle size of an active material.

(Summary of One Aspect According to the Present Disclosure)

A solid-state battery according to a first aspect of the present disclosure includes:
a negative electrode layer including a negative electrode active material;
a positive electrode layer; and
a solid electrolyte layer positioned between the positive electrode layer and the negative electrode layer, wherein the negative electrode active material includes:

a graphite particle being an aggregate of a plurality of primary particles including graphite, the graphite particle having a void inside; and a solid electrolyte being present in the void.

According to the first aspect, the negative electrode active material included in the negative electrode layer has high electron conductivity owing to the graphite particle. Moreover, insertion and desorption of lithium ions efficiently progress in the negative electrode active material. The negative electrode active material can improve the rate characteristics of the solid-state battery.

According to a second aspect of the present disclosure, for example, in the solid-state battery according to the first aspect, at least a portion of the void may be filled with the solid electrolyte, and the void may have a minimum diameter of 1 nm or more and 70 nm or less. With such a structural feature, the rate characteristics of the solid-state battery can be improved.

According to a third aspect of the present disclosure, for example, in the solid-state battery according to the first or second aspect, the plurality of primary particles each may have a shape of a plate or a flake, and the plurality of primary particles may be laid one upon another in the graphite particle. With such a structural feature, the negative electrode active material can be easily produced using the graphite particle.

According to a fourth aspect of the present disclosure, for example, in the solid-state battery according to any one of the first to third aspects, the solid electrolyte may include lithium, phosphorus, sulfur, and halogen. With such a structural feature, the negative electrode active material has high ion conductivity.

According to a fifth aspect of the present disclosure, for example, in the solid-state battery according to any one of the first to fourth aspects, the solid electrolyte may be represented by the following composition formula (1):

$$Li_\alpha PS_\beta X_\gamma \qquad \text{Formula (1)},$$

where $\alpha$, $\beta$, and $\gamma$ may satisfy $5.5 \le \alpha \le 6.5$, $4.5 \le \beta \le 5.5$, and $0.5 \le \gamma \le 1.5$, and X may include at least one selected from the group consisting of F, Cl, Br, and I. With such a structural feature, the negative electrode active material has high ion conductivity.

According to a sixth aspect of the present disclosure, for example, in the solid-state battery according to any one of the first to fifth aspects, the solid electrolyte may have an argyrodite crystal structure. With such a structural feature, the negative electrode active material has high ion conductivity.

According to a seventh aspect of the present disclosure, for example, in the solid-state battery according to any one of the first to sixth aspects, a ratio of a mass of the solid electrolyte to a mass of the graphite particle may be 0.3 mass % or more and 10 mass % or less. With such a structural feature, in the negative electrode active material, the ion conductivity can be improved while a decrease in capacity density is reduced.

According to an eighth aspect of the present disclosure, for example, in the solid-state battery according to any one of the first to seventh aspects, the graphite particle may have a median size of 300 nm or more and 30 μm or less. With such a structural feature, the graphite particle can be easily handled. Moreover, the solid electrolyte can be easily introduced into the graphite particle.

According to a ninth aspect of the present disclosure, for example, in the solid-state battery according to any one of the first to eighth aspects, the negative electrode layer may further include a solid electrolyte having composition different from composition of the solid electrolyte included in the negative electrode active material. With such a structural feature, the ion conductivity of the negative electrode layer can be easily improved.

According to a tenth aspect of the present disclosure, for example, in the solid-state battery according to any one of the first to ninth aspects, the solid electrolyte layer may include a solid electrolyte having lithium ion conductivity. With such a structural feature, the solid-state battery has high rate characteristics.

Hereinafter, an embodiment of the present disclosure will be described with reference to the drawings.

Embodiment 1

FIG. 1 is a cross-sectional view schematically showing a configuration of a solid-state battery 2000 of Embodiment 1.

The solid-state battery 2000 of Embodiment 1 includes a negative electrode layer 201, a solid electrolyte layer 202, and a positive electrode layer 203.

The solid electrolyte layer 202 is positioned between the positive electrode layer 203 and the negative electrode layer 201.

The negative electrode layer 201 includes a negative electrode material including a negative electrode active material 1000.

Figure 2:
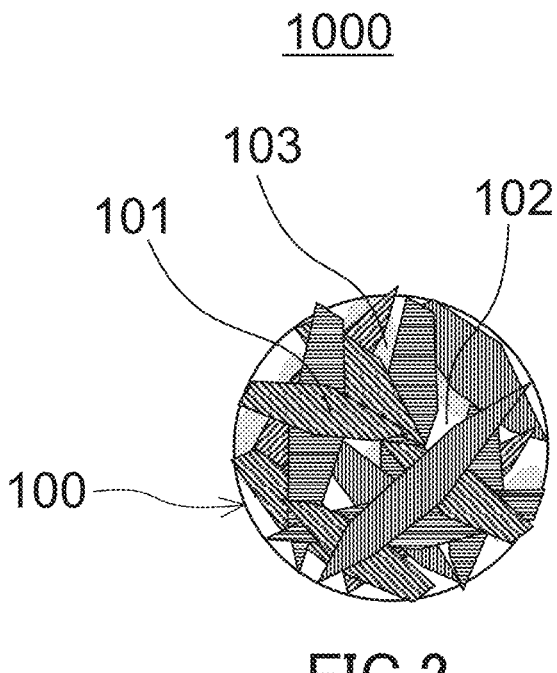
FIG. 2 is a cross-sectional view schematically showing a configuration of a negative electrode active material used for production of a negative electrode layer.

Hereinafter, the negative electrode active material 1000 that is used to produce the negative electrode layer 201 will be described first. FIG. 2 is a cross-sectional view schematically showing a configuration of the negative electrode active material 1000 that is used to produce the negative electrode layer 201.

The negative electrode active material 1000 includes a graphite particle 100 and a solid electrolyte 103.

The graphite particle 100 can function as an active material. The graphite particle 100 has a void 102 inside. The graphite particle 100 may have a plurality of the voids 102 inside. The solid electrolyte 103 is present in the void 102. In other words, the solid electrolyte 103 is filled in the void 102. Herein, the solid electrolyte 103 that is present in the void 102 may be called "first solid electrolyte".

The negative electrode active material 1000 includes the first solid electrolyte 103 inside the void 102 of the graphite particle 100. The negative electrode active material 1000 therefore tends to have high ion conductivity and high electron conductivity.

The graphite particle 100 is an aggregate of a plurality of primary particles 101 including graphite. In other words, the graphite particle 100 is a secondary particle formed of the plurality of primary particles 101. In the graphite particle 100, the plurality of primary particles 101 may be in contact with each other. The primary particle 101 can form an intercalation compound including carbon. In the graphite particle 100, for example, the void 102 is arranged between the plurality of primary particles 101.

The shape of the primary particle 101 is not particularly limited, and the primary particle 101 has, for example, the shape of a plate or a flake. The shape of the primary particle 101 may be the shape of a needle, a sphere, an ellipsoid, or the like. In the graphite particle 100, the plurality of primary particles 101 having a shape of a plate or a flake may be laid one upon another. That is, the graphite particle 100 may have a layer structure formed of the plurality of primary particles 101 having the shape of a plate or a flake. In this layer structure, for example, the void 102 is arranged between two of the primary particles 101. The void 102 extends, for example, perpendicular to a direction in which the plurality of primary particles 101 are laid one upon another.

In one example, the graphite particle 100 may have the plurality of voids 102, and the plurality of voids 102 may be arranged in the direction in which the plurality of primary particles 101 are laid one upon another. The plurality of voids 102 may be independent of each other. However, at least one of the plurality of voids 102 may be connected to another void 102. The plurality of voids 102 may be arranged three-dimensionally and continuously. At least one of the plurality of voids 102 may penetrate the graphite particle 100.

For example, the graphite particle 100 is spherical or ellipsoidal. In this case, the plurality of primary particles 101 having the shape of a plate or a flake overlap and coalesce into one in a central portion of the graphite particle 100 such that principal surfaces of the primary particles 101 extend in a diameter direction of the graphite particle 100. In an outer portion of the graphite particle 100, the plurality of primary particles 101 having the shape of a plate or a flake and being curved overlap and coalesce into one. Some of the plurality of primary particles 101 are bent and overlap another primary particle 101. Some of the voids 102 are arranged between two of the primary particles 101, while others are arranged in a space formed by bending the primary particle 101. The term "principal surface" means a face having the largest area.

The primary particle 101 may include graphite as a main component, and, for example, substantially consists of graphite. The term "main component" means a component whose content is highest in the primary particle 101 on a mass basis. The phrase "substantially consisting of" a material means other components that alter essential characteristics of the material are excluded. However, the primary particle 101 may include impurities other than graphite.

At least a portion of the void 102 may be filled with the first solid electrolyte 103. The void 102 may be fully occupied by the first solid electrolyte 103.

The void 102 in which the first solid electrolyte 103 is present has a shortest diameter of, for example, 1 nm or more and 70 nm or less. The first solid electrolyte 103 can be easily introduced into the void 102 having a shortest diameter of 1 nm or more. When the shortest diameter of the void 102 is 70 nm or less, an ion conduction path is not too long, and thus the negative electrode active material 1000 has sufficient ion conductivity.

The shortest diameter of the void 102 can be determined in the following manner. First, the negative electrode active material 1000 is processed to expose a cross-section of the negative electrode active material 1000. The negative electrode active material 1000 can be processed, for example, using a Cross Section Polisher (registered trademark). A smooth cross-section of the negative electrode active material 1000 can be formed using a Cross Section Polisher. Then, the cross-section of the negative electrode active material 1000 is observed using a scanning electron microscope (SEM). A SEM image of the cross-section of the negative electrode active material 1000 can be obtained thereby.

Next, the graphite particle 100, the void 102, and the first solid electrolyte 103 are recognized in the SEM image. These may be recognized on the basis of contrast of the image or on the basis of the results of element analysis such as energy dispersive X-ray spectroscopy (EDS). Then, the center of gravity of the void 102 is determined in the SEM image. The shortest diameter of diameters of the void 102 can be considered the shortest diameter of the void 102, the diameters passing through the center of gravity of the void 102.

The shortest diameter of the void 102 may be 10 nm or more, or 20 nm or more. The shortest diameter of the void 102 may be 65 nm or less. Additionally, the average shortest diameter of the voids 102 may be 1 nm or more and 70 nm or less. The average shortest diameter of the voids 102 can be determined in the following manner. First, a cross-section of the negative electrode active material 1000 is observed with a SEM. Using the resulting SEM image, the shortest diameters of an arbitrary number of (e.g., 5) voids 102 are calculated. The average of the resulting values is considered the average shortest diameter of the voids 102. When the SEM image shows a plurality of the voids 102, the shortest diameter that is greatest of the shortest diameters of the plurality of voids 102 shown may be 1 nm or more and 70 nm or less.

The presence of the first solid electrolyte 103 in the void 102 may be confirmed by SEM observation of a cross-section of the negative electrode active material 1000 or by a mercury intrusion method.

In the mercury intrusion method, pressurized mercury is injected into a specimen having voids. A void distribution can be determined from a relation between the pressure applied to the mercury and the amount of the mercury injected into the specimen. Specifically, for the specimen, a diameter D of a void into which the mercury was injected can be determined by the following relational expression (I). In the relational expression (I), γ represents a surface tension of the mercury. A symbol θ represents a contact angle between the mercury and a wall surface of the specimen. A symbol P represents a pressure applied to the mercury.

$$D = -4\gamma \cos \theta \div P \qquad (I)$$

The pressure P is changed in stages, and the amount of the injected mercury is measured for each stage. The amount of the injected mercury can be considered a cumulative value of the volumes of the voids having a diameter D or greater, the diameter D corresponding to a particular pressure P. A void distribution in which the amount of the voids is specified for each diameter D can be obtained thereby. The void distribution is, for example, a graph showing a relation between the void diameter D and a log differential void volume.

For example, the negative electrode active material 1000 and the graphite particle 100 in which the first solid electrolyte 103 is not present in the void 102 are measured by the mercury intrusion method. The graphite particle 100 in which the first solid electrolyte 103 has not been introduced into the voids 102 or the graphite particle 100 obtained by removing the first solid electrolyte 103 from the negative electrode active material 1000 can be used as the graphite particle 100 in which the first solid electrolyte 103 is not present in the voids 102. The first solid electrolyte 103 can be removed from the negative electrode active material 1000, for example, using a solvent, etc. A void distribution showing a relation between the void diameter and the log differential void volume can be obtained by the mercury intrusion method for each of the negative electrode active material 1000 and the graphite particle 100. The void diameters in the void distribution of the graphite particle 100 correspond to the void sizes of the voids 102.

On the basis of the void distribution of the negative electrode active material 1000 and that of the graphite particle 100, it is possible to confirm that the first solid electrolyte 103 is present in the void 102 of the graphite particle 100 in the negative electrode active material 1000. For example, the log differential void volume at a particular diameter is determined for the void distribution of each of the negative electrode active material 1000 and the graphite particle 100. When the log differential void volume of the negative electrode active material 1000 is smaller at the particular diameter than the log differential void volume of the graphite particle 100, it can be understood that the first solid electrolyte 103 is present in the void 102 of the graphite particle 100. Additionally, when the diameter at a peak in the void distribution of the negative electrode active material 1000 is smaller than the diameter at a peak in the void distribution of the graphite particle 100, it can be understood that the first solid electrolyte 103 is present in the void 102 of the graphite particle 100.

When the graphite particle 100 has the plurality of voids inside, an average void size S, determined by the mercury intrusion method, of the graphite particle 100 is not particularly limited. The average void size S of the graphite particle 100 is, for example, 1 nm or more and 300 nm or less. The average void size S may be 10 nm or more, 50 nm or more, 100 nm or more, or 150 nm or more. The average void size S may be 250 nm or less, or 200 nm or less.

The average void size S of the graphite particle 100 can be determined, for example, in the following manner. First, the graphite particle 100 in which the first solid electrolyte 103 is not present in the voids 102 is measured by the mercury intrusion method. The graphite particle 100 in which the first solid electrolyte 103 has not been introduced into the voids 102 or the graphite particle 100 obtained by removing the first solid electrolyte 103 from the negative electrode active material 1000 can be used as the graphite particle 100 in which the first solid electrolyte 103 is not present in the voids 102. A void distribution showing a relation between the void diameter and the log differential void volume can be obtained for the graphite particle 100 by the mercury intrusion method. Next, a peak in the void distribution of the graphite particle 100 is determined. The diameter at a peak in the void distribution can be considered the average void size S. The diameter at a peak in the void distribution corresponds to the mode diameter of the voids.

The shape of the graphite particle 100 is, for example, but not particularly limited to, the shape of a sphere or an ellipsoid. The spherical or ellipsoidal graphite particle 100 has few protruding portions protruding from a surface of the particle. Therefore, smooth application of a coating liquid containing such a graphite particle 100 is less likely to be hindered. A negative electrode layer in which the graphite particle 100 is packed at a high density can be easily produced using this coating liquid. However, the graphite particle 100 may have the protruding portion formed of the plate-like primary particle 101.

The median size of the graphite particle 100 is not particularly limited, and the graphite particle 100 has a median size of, for example, 300 nm or more and 30 μm or less. The graphite particle 100 having a median size of 300 nm or more can be easily handled and is suitable for producing the negative electrode active material 1000 and the negative electrode layer 201. The first solid electrolyte 103 can be easily introduced into the graphite particle 100 having a median size of 30 μm or less. The graphite particle 100 may have a median size of 1 μm or more and 10 μm or less.

The term "median size" commonly means a particle size at 50% in a volume-based cumulative particle size distribution. The volume-based particle size distribution is measured, for example, using a laser diffraction measurement apparatus.

The graphite particle 100 including the plurality of voids 102 can be considered a porous material. A specific surface area of the graphite particle 100 is, for example, but not particularly limited to, 5 m²/g or more. When the graphite particle 100 has a specific surface area of 5 m²/g or more, an inner surface of the graphite particle 100 can be coated with a sufficient amount of the first solid electrolyte 103, the inner surface surrounding the void 102. The larger specific surface area the graphite particle 100 has, the larger area of the inner surface of the graphite particle 100 the first solid electrolyte 103 can coat. The specific surface area of the graphite particle 100 can be measured, for example, by the mercury intrusion method. The specific surface area of the graphite particle 100 can also be obtained by converting, by a BET (Brunauer-Emmett-Teller) method, adsorption isotherm data obtained by a gas adsorption method using a nitrogen gas.

The graphite particle 100 may have a void rate of 5% or more. The inner surface of the graphite particle 100 having a void rate of 5% or more can be coated with a sufficient amount of the first solid electrolyte 103. The upper limit of the void rate of the graphite particle 100 is, for example, but not particularly limited to, 50%. The graphite particle 100 having a void rate of 50% or less tends to have a sufficiently high strength. The void rate of the graphite particle 100 can be measured, for example, by the mercury intrusion method. The void rate of the graphite particle 100 can also be calculated from the volume of the voids 102, the volume being obtained by the gas adsorption method using a nitrogen gas.

The shape of the first solid electrolyte 103 is not particularly limited, and may be the shape of a needle, a sphere, an ellipsoid, or the like. The first solid electrolyte 103 may have the shape of a particle. The first solid electrolyte 103 may have the shape of a film coating the inner surface of the graphite particle 100. In an in-plane direction of the first solid electrolyte 103 having the shape of such a film, ionic conduction tends to be promoted. The shape of the first solid electrolyte 103 can be determined by observing a cross-section of the negative electrode active material 1000 using an electron microscope.

When the first solid electrolyte 103 has the shape of a sphere, the first solid electrolyte 103 may have a median size of 1 nm or more and 100 nm or less, or 1 nm or more and 70 nm or less.

The negative electrode active material 1000 may further include or does not need to include a solid electrolyte attached to an outer surface of the graphite particle 100. Herein, the solid electrolyte attached to the outer surface of the graphite particle 100 may be called "second solid electrolyte". A rate at which the outer surface of the graphite particle 100 is coated by the second solid electrolyte is not particularly limited, and is, for example, 10% or less. The coating rate may be 5% or less, 3% or less, or 1% or less.

The rate at which the outer surface of the graphite particle 100 is coated by the second solid electrolyte can be measured in the following manner. First, a surface of the negative electrode active material 1000 is observed using a scanning electron microscope. Areas A1 and A2 of the negative electrode active material 1000 and the second solid electrolyte, respectively, shown in the obtained electron microscope image are calculated by image processing. A ratio of the area A2 to the area A1 can be considered the rate at which the outer surface of the graphite particle 100 is coated by the second solid electrolyte.

The second solid electrolyte is commonly formed when the first solid electrolyte 103 is introduced into the void 102 of the graphite particle 100. Therefore, the composition of the second solid electrolyte is, for example, the same as that of the first solid electrolyte 103. The first solid electrolyte 103, which is introduced into the tiny void 102, is poorly crystallized in some cases. A solid electrolyte that is poorly crystallized often has poor ion conductivity compared to a solid electrolyte that is highly crystallized. Therefore, the negative electrode material for producing the negative electrode layer of the all-solid-state battery may further include a solid electrolyte having a higher ion conductivity than that of the first solid electrolyte 103. When the rate at which the outer surface of the graphite particle 100 is coated by the second solid electrolyte is 10% or less, the solid electrolyte having a higher ion conductivity is likely to have contact with the outer surface of the graphite particle 100 in the negative electrode material. Therefore, with the use of such a negative electrode active material 1000, the negative electrode layer having high ion conductivity can be easily produced.

In the negative electrode active material 1000, a ratio P1 of a mass of the first solid electrolyte 103 to a mass of the graphite particle 100 is not particularly limited, and may be 0.3 mass % or more and 20 mass % or less, 0.3 mass % or more and 10 mass % or less, or 1.0 mass % or more and 6.0 mass % or less. When the ratio P1 is 0.3 mass % or more, the number of ion conduction paths in the negative electrode active material 1000 can be sufficiently increased. When the ratio P1 is 20 mass % or less, a decrease in a capacity density of the negative electrode layer 201 can be sufficiently reduced. Furthermore, in the negative electrode active material 1000, a ratio P2 of the sum of the mass of the first solid electrolyte 103 and a mass of the second solid electrolyte to the mass of the graphite particle 100 may be 0.3 mass % or more and 20 mass % or less, 0.3 mass % or more and 10 mass % or less, or 1.0 mass % or more and 6.0 mass % or less.

The first solid electrolyte 103 has, for example, lithium ion conductivity. The first solid electrolyte 103 includes, for example, at least one selected from the group consisting of an inorganic solid electrolyte and an organic solid electrolyte. The first solid electrolyte 103 may include a sulfide solid electrolyte. Since having high reduction stability, the sulfide solid electrolyte is suitable for being combined with the graphite particle 100 being a low-electric potential negative electrode material.

The sulfide solid electrolyte included in the first solid electrolyte 103 may include lithium, phosphorus, sulfur, and halogen. The first solid electrolyte 103 is, for example, represented by the following composition formula (1).

$$Li_\alpha PS_\beta X_\gamma \qquad \text{Formula (1)}$$

In the formula (1), $\alpha$, $\beta$, and $\gamma$ satisfy $5.5 \le \alpha \le 6.5$, $4.5 \le \beta \le 5.5$, and $0.5 \le \gamma \le 1.5$. The symbol X includes at least one selected from the group consisting of F, Cl, Br, and I. The symbol X may be Cl or Br, or may be Cl. The first solid electrolyte 103 may be $Li_6PS_5X$. The solid electrolyte represented by the composition formula (1) has, for example, an argyrodite crystal structure. That is, the first solid electrolyte 103 may have an argyrodite crystal structure. The negative electrode active material 1000 including such a first solid electrolyte 103 tends to have high ion conductivity.

Examples of the sulfide solid electrolyte other than the solid electrolyte represented by the composition formula (1) include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX, $Li_2O$, $MO_q$, $Li_pMO_q$, or the like may be added thereto. Here, the element X in "LiX" is at least one element selected from the group consisting of F, Cl, Br, and I. The element M in "$MO_q$" and "$Li_pMO_q$" is at least one element selected from the group consisting of P, Si, Ge, B, Al, Ga, In, Fe, and Zn. The symbols p and q in "$MO_q$" and "$Li_pMO_q$" are each an independent natural number.

The first solid electrolyte 103 may include at least one selected from the group consisting of an oxide solid electrolyte, a polymer solid electrolyte, and a complex hydride solid electrolyte.

As the oxide solid electrolyte can be used, for example, a NASICON solid electrolyte typified by $LiTi_2(PO_4)_3$ and element-substituted substances thereof; a $(LaLi)TiO_3$-based perovskite solid electrolyte; a LISICON solid electrolyte typified by $Li_{14}ZnGe_4O_{16}$, $Li_4SiO_4$, and $LiGeO_4$ and element-substituted substances thereof; a garnet solid electrolyte typified by $Li_7La_3Zr_2O_{12}$ and element-substituted substances thereof; $Li_3N$ and H-substituted substances thereof; $Li_3PO_4$ and N-substituted substances thereof; or a glass or glass ceramic including a base material that includes a Li—B—O compound such as $LiBO_2$ or $Li_3BO_3$ and to which a material such as $Li_2SO_4$, $Li_2CO_3$, or the like has been added.

For example, a compound of a polymer compound and a lithium salt can be used as the polymer solid electrolyte. The polymer compound may have an ethylene oxide structure. The polymer compound having an ethylene oxide structure can contain a large amount of a lithium salt, and therefore, the ionic conductivity can be further increased. $LiPF_6$, $LiBF_4$, $LiSbF_6$, $LiAsF_6$, $LiSO_3CF_3$, $LiN(SO_2CF_3)_2$, LiN $(SO_2C_2F_5)_2$, $LiN(SO_2CF_3)(SO_2C_4F_9)$, $LiC(SO_2CF_3)_3$, or the like can be used as the lithium salt. As the lithium salt, one lithium salt selected from these may be used alone, or a mixture of two or more lithium salts selected from these may be used.

For example, $LiBH_4$—LiI or $LiBH_4$—$P_2S_5$ can be used as the complex hydride solid electrolyte.

The shape of the negative electrode active material 1000 is, for example, but not particularly limited to, the shape of a sphere or an ellipsoid. The negative electrode active material 1000 may have the shape of a particle. When the negative electrode active material 1000 has the shape of a particle, the median size of the negative electrode active material 1000 is not particularly limited, and is, for example, 300 nm or more and 30 μm or less.

Figure 3:
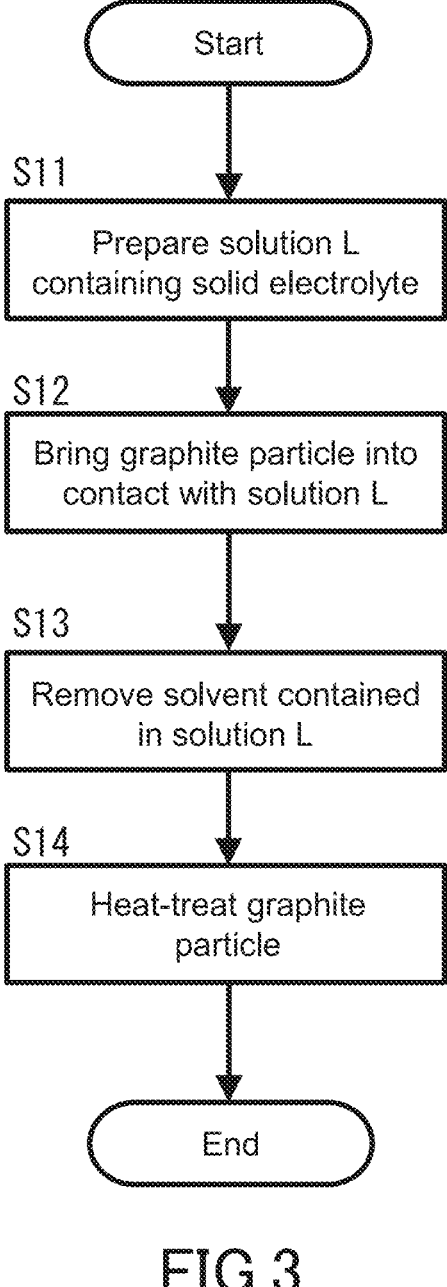
FIG. 3 is a flow chart of a method for producing the negative electrode active material.

Next, a method for producing the negative electrode active material 1000 will be described. FIG. 3 is a flow chart of the method for producing the negative electrode active material 1000. First, in a step S11, a solution L containing the first solid electrolyte 103 is prepared. Specific examples of the solution L are described in non-patent literatures such as J. Mater. Chem. A, 2019, 7, 558-566. The concentration of the first solid electrolyte 103 in the solution L is, for example, but not particularly limited to, 1 mass % or more and 20 mass % or less.

The above non-patent literature discloses a method for producing a sulfide solid electrolyte represented by $Li_6PS_5Br$ from a solution. Specifically, the non-patent literature discloses removing, from a solution containing the above solid electrolyte, a solvent contained in the solution by volatilization and then performing heating treatment to produce a solid electrolyte. As a result of a detailed study, the present inventors have revealed that other solid electrolytes having an argyrodite crystal structure can be synthesized by the method described in the non-patent literature. Examples of the other solid electrolytes include $Li_6PS_5Cl$.

Next, in a step S12, the graphite particle 100 having the void 102 inside is brought into contact with the solution L. The solution L does not include, for example, particles of the first solid electrolyte 103. Therefore, when the graphite particle 100 is brought into contact with the solution L, the solution L can easily permeate the tiny void 102 of the graphite particle 100. Specifically, the solution L easily permeates the graphite particle 100 by capillary action. The solution L is thereby introduced into the void 102. The method for bringing the graphite particle 100 into contact with the solution L is not limited to a particular method. For example, the graphite particle 100 may be brought into contact with the solution L by kneading the graphite particle 100 and the solution L. When the graphite particle 100 is brought into contact with the solution L, a ratio of the mass of the first solid electrolyte 103 to the sum of the mass of the graphite particle 100 and the mass of the first solid electrolyte 103 is, for example, but not particularly limited to, more than 0.2 mass % and 20 mass % or less.

The method for producing the graphite particle 100 having the void 102 inside is not limited to a particular method. The graphite particle 100 can be produced, for example, by a known spheroidization of the plurality of primary particles 101. In one example, the graphite particle 100 can be produced by dispersing the plurality of primary particles 101 in an inert gas flow to collide with each other in the flow. The spheroidization can be performed using a commercially-available apparatus.

Next, in a step S13, the solvent contained in the solution L is removed. This causes deposition of the first solid electrolyte 103 inside the void 102. The solvent is removed, for example, by volatilization of the solvent. In one example, the graphite particle 100 and the solution L may be kneaded to volatilize the solvent of the solution L. The solvent of the solution L having permeated the graphite particle 100 is less likely to be volatilized than the solvent of the solution L on the outside of the graphite particle 100. Therefore, the volatilization of the solvent contained in the solution L tends to condense the first solid electrolyte 103 inside the void 102 of the graphite particle 100. After the volatilization of the solvent of the solution L, the first solid electrolyte 103 is rarely present on the outside of the graphite particle 100 and is supported in the void 102 by the graphite particle 100. Therefore, the negative electrode active material 1000 hardly including the second solid electrolyte attached to an outer surface of the graphite particle 100 can be easily produced by this method.

Next, in a step 14, the graphite particle 100 may be subjected to a heating treatment. The conditions of the heating treatment can be set as appropriate in accordance with, for example, the composition of the first solid electrolyte 103. The temperature of the heating treatment is, for example, but not particularly limited to, 100° C. or higher. The duration of the heating treatment is, for example, but not particularly limited to, 1 hour or more. The heating treatment may be performed under reduced pressure or under vacuum atmosphere. The heating treatment of the graphite particle 100 tends to improve the degree of crystallization of the first solid electrolyte 103.

The method for producing the negative electrode active material 1000 is not limited to the one in the flow chart of FIG. 3. For example, the negative electrode active material 1000 may be produced using a dispersion solution of the first solid electrolyte 103 instead of the solution L1.

Next, the negative electrode active material 1000 in the negative electrode layer 201 will be described. In production of an all-solid-state battery using the negative electrode active material 1000, the negative electrode material including the negative electrode active material 1000 can be compression-molded in some cases. The negative electrode active material 1000 can be deformed in some cases by compression-molding of the negative electrode material. As a result of deformation of the negative electrode active material 1000, in some cases, the volume of a space where the first solid electrolyte 103 is not present can decrease and the space can disappear. Therefore, in the negative electrode active material 1000 in the negative electrode layer 201, every void 102 can be filled with the first solid electrolyte 103 in some cases. FIG. 1 shows the negative electrode active material 1000 from which the space where the first solid electrolyte 103 is not present has disappeared. In other words, every void 102 is filled with the first solid electrolyte 103 in FIG. 1. However, not every void 102 needs to be filled with the first solid electrolyte 103 in the negative electrode active material 1000 in the negative electrode layer 201. In the case where the negative electrode material is compression-molded, a pressure applied to the negative electrode material can be determined as appropriate according to composition of the negative electrode material as long as the negative electrode active material 1000 in the negative electrode material can be adhered to each other without broken. The pressure applied to the negative electrode material is, for example, 1 MPa or more and 10 GPa or less.

In the negative electrode active material 1000 in the negative electrode layer 201, the shortest diameter of the void 102 in which the first solid electrolyte 103 is present is, for example, 1 nm or more and 70 nm or less.

The shortest diameter of the void 102 of the negative electrode active material 1000 in the negative electrode layer 201 can be determined in the following manner. First, the negative electrode layer 201 is processed to expose a cross-section of the negative electrode layer 201. The negative electrode layer 201 can be processed, for example, using a Cross Section Polisher (registered trademark). A smooth cross-section of the negative electrode layer 201 can be formed using a Cross Section Polisher. Then, the cross-section of the negative electrode layer 201 is observed using a scanning electron microscope (SEM). A SEM image of the cross-section of the negative electrode layer 201 can be obtained thereby.

Next, the negative electrode active material 1000, the graphite particle 100, the void 102, and the first solid electrolyte 103 are recognized in the SEM image. These may be recognized on the basis of contrast of the image or on the basis of the results of element analysis such as energy dispersive X-ray spectroscopy (EDS). Then, the center of gravity of the void 102 is determined in the SEM image. The shortest diameter of diameters of the void 102 can be considered the shortest diameter of the void 102, the diameters passing through the center of gravity of the void 102.

The shortest diameter of the void 102 may be 10 nm or more, or 20 nm or more. The shortest diameter of the void 102 may be 65 nm or less. Additionally, the average shortest diameter of the voids 102 may be 1 nm or more and 70 nm or less. The average shortest diameter of the voids 102 can be determined in the following manner. First, a cross-section of the negative electrode layer 201 is observed with a SEM. Using the resulting SEM image, the shortest diameters of an arbitrary number of (e.g., 5) voids 102 are calculated. The average of the resulting values is considered the average shortest diameter of the voids 102. When the SEM image shows a plurality of the voids 102, the shortest diameter that is greatest of the shortest diameters of the plurality of voids 102 shown may be 1 nm or more and 70 nm or less.

In the negative electrode active material 1000 in the negative electrode layer 201, the presence of the first solid electrolyte 103 in the void 102 can be confirmed by SEM observation of a cross-section of the negative electrode layer 201.

In the negative electrode material in the negative electrode layer 201, a plurality of the negative electrode active materials 1000 may be in contact with each other to form an electron conduction path.

The negative electrode material may further include a solid electrolyte 105 in addition to the negative electrode active material 1000. The solid electrolyte 105 may be herein called "third solid electrolyte". The third solid electrolyte 105 fills, for example, a space between the plurality of negative electrode active materials 1000. The third solid electrolyte 105 may have the shape of a particle. An ion conduction path may be formed by compressing and binding a lot of particles of the third solid electrolyte 105.

The third solid electrolyte 105 may be or does not need to be in contact with the second solid electrolyte of the negative electrode active material 1000. When the third solid electrolyte 105 is in contact with the second solid electrolyte, ionic conduction into the graphite particle 100 can efficiently occur.

The third solid electrolyte 105 has, for example, lithium ion conductivity. The third solid electrolyte 105 includes, for example, at least one selected from the group consisting of an inorganic solid electrolyte and an organic solid electrolyte. The third solid electrolyte 105 may include at least one selected from the group consisting of a sulfide solid electrolyte, an oxide solid electrolyte, a halide solid electrolyte, a polymer solid electrolyte, and a complex hydride solid electrolyte or may include a sulfide solid electrolyte. As the sulfide solid electrolyte, the oxide solid electrolyte, the polymer solid electrolyte, and the complex hydride solid electrolyte, those described for the first solid electrolyte 103 can be used. Specific examples of the halide solid electrolyte will be described later in the description of the solid electrolyte layer 202.

The third solid electrolyte 105 is desirably made of a soft material to achieve a favorable dispersion state. From this perspective, at least one selected from the group consisting of the sulfide solid electrolyte and the halide solid electrolyte is suitable as the third solid electrolyte 105.

The composition of the third solid electrolyte 105 may be the same as or different from that of the first solid electrolyte 103. In one example, the composition of the first solid electrolyte 103 may be adjusted so that the first solid electrolyte 103 will be easily introduced into the tiny void 102 of the graphite particle 100. The composition of the third solid electrolyte 105 may be adjusted to have high ion conductivity.

The shape of the third solid electrolyte 105 is not particularly limited, and may be the shape of a needle, a sphere, an ellipsoid, a flake, or the like. The third solid electrolyte 105 may have the shape of a particle.

When the third solid electrolyte 105 has the shape of a particle (e.g., a sphere), the third solid electrolyte 105 may have a median size of 0.3 μm or more and 100 μm or less. When the third solid electrolyte 105 has a median size of 0.3 μm or more, a contact interface between the particles of the third solid electrolyte 105 is not increased too much and an increase in the ionic resistance inside the negative electrode layer 201 can be reduced. This allows a battery to operate at a high power.

When the third solid electrolyte 105 has a median size of 100 μm or less, the negative electrode active material 1000 and the third solid electrolyte 105 are likely to be in a favorable dispersion state in the negative electrode material. This makes it easy to increase the capacity of a battery.

The median size of the third solid electrolyte 105 may be smaller than that of the negative electrode active material 1000. In this case, the negative electrode active material 1000 and the third solid electrolyte 105 can be in a favorable dispersion state in the negative electrode material.

The negative electrode material may further include an additional active material other than the negative electrode active material 1000. The shape of the additional active material is not particularly limited, and may be the shape of a needle, a sphere, an ellipsoid, or the like. The additional active material may have the shape of a particle.

The additional active material may have a median size of 0.1 μm or more and 100 μm or less.

When the additional active material has a median size of 0.1 μm or more, the additional active material and the third solid electrolyte 105 are likely to be in a favorable dispersion state in the negative electrode material. This improves the charge characteristics of a battery.

When the additional active material has a median size of 100 μm or less, the diffusion rate of lithium in the active material is sufficiently ensured. This allows a battery to operate at a high power.

The median size of the additional active material may be larger than that of the third solid electrolyte 105. In this case, the active material and the third solid electrolyte 105 can be in a favorable dispersion state.

The additional active material includes a material having properties of occluding and releasing metal ions (e.g., lithium ions). A metal material, a carbon material, an oxide, a nitride, a tin compound, a silicon compound, or the like can be used as the additional active material. The metal material may be an elemental metal or an alloy. Examples of the metal material include lithium metal and a lithium alloy. Examples of the carbon material include natural graphite, coke, semi-graphitized carbon, carbon fibers, spherical carbon, artificial graphite, and amorphous carbon. In terms of the capacity density, silicon (Si), tin (Sn), a silicon compound, or a tin compound can be suitably used. The additional active material may include a single active material or a plurality of active materials having different compositions.

The negative electrode active material 1000 and the particles of the third solid electrolyte 105 may be in contact with each other as shown in FIG. 1. The negative electrode material may include the plurality of negative electrode active materials 1000 and the plurality of particles of the third solid electrolyte 105.

In the negative electrode material, the amount of the third solid electrolyte 105 and the amount of the negative electrode active material 1000 may be the same or different.

When the total amount of the negative electrode material is 100 mass %, the amount of the negative electrode active material 1000 may be 40 mass % or more and 90 mass % or less, or 40 mass % or more and 80 mass % or less. The negative electrode active material 1000 and the third solid electrolyte 105 are likely to be in a favorable dispersion state by appropriately adjusting the amount of the negative electrode active material 1000.

The negative electrode material may include only the negative electrode active material 1000 and the third solid electrolyte 105. In other words, the negative electrode material may substantially consist of the negative electrode active material 1000 and the third solid electrolyte 105. With such a structural feature, the energy density of a battery can be improved. The phrase "including only the negative electrode active material 1000 and the third solid electrolyte 105" means that other materials are not included intentionally except for inevitable impurities.

For a mass ratio "w1:100−w1" between the active material and the third solid electrolyte 105 in the negative electrode layer 201, 40≤w1≤90 may be satisfied, or 40≤w1≤80 may be satisfied. When 40≤w1 is satisfied, the solid-state battery 2000 has a sufficient energy density. When w1≤90 is satisfied, the solid-state battery 2000 can operate at a high power.

The negative electrode layer 201 may have a thickness of 10 μm or more and 500 μm or less. When the negative electrode layer 201 has a thickness of 10 μm or more, the solid-state battery 2000 has a sufficient energy density. When the negative electrode layer 201 has a thickness of 500 μm or less, the solid-state battery 2000 can operate at a high power.

The solid electrolyte layer 202 may include a layer including a solid electrolyte.

As the solid electrolyte included in the solid electrolyte layer 202, for example, an inorganic solid electrolyte having lithium ion conductivity can be used. A sulfide solid electrolyte, an oxide solid electrolyte, a halide solid electrolyte, or the like is used as the inorganic solid electrolyte.

The halide solid electrolyte may be used as the solid electrolyte included in the solid electrolyte layer 202.

The halide solid electrolyte is represented, for example, by the following composition formula (2). In the composition formula (2), α, β, and γ are each independently a value greater than 0. A symbol M includes at least one element selected from the group consisting of metalloid elements and metal elements other than Li. A symbol X is at least one selected from the group consisting of F, Cl, Br, and I.

$$\mathrm{Li}_\alpha \mathrm{M}_\beta \mathrm{X}_\gamma \qquad\qquad \text{Formula (2)}$$

The metalloid elements include B, Si, Ge, As, Sb, and Te. The metal elements include all the elements included in Groups 1 to 12 of the periodic table, except for hydrogen, and all the elements included in Groups 13 to 16, except for B, Si, Ge, As, Sb, Te, C, N, P, O, S, and Se. That is, the metal elements refer to a group of elements that can become cations when forming an inorganic compound with a halogen compound.

$\mathrm{Li}_3\mathrm{YX}_6$, $\mathrm{Li}_2\mathrm{MgX}_4$, $\mathrm{Li}_2\mathrm{FeX}_4$, $\mathrm{Li}(\mathrm{Al},\mathrm{Ga},\mathrm{In})\mathrm{X}_4$, $\mathrm{Li}_3(\mathrm{Al},\mathrm{Ga},\mathrm{In})\mathrm{X}_6$, or the like can be used as the halide solid electrolyte.

The above configuration can improve the power density of the solid-state battery 2000. The above configuration can also improve the thermal stability of the solid-state battery 2000 and reduce generation of a harmful gas such as hydrogen sulfide.

In the present disclosure, when an element in a formula is expressed, for example, as "(Al, Ga, In)", the expression "(Al, Ga, In)" represents at least one element selected from the group of elements in the parentheses. That is, the expression "(Al, Ga, In)" is synonymous with the expression "at least one selected from the group consisting of Al, Ga, and In". The same applies to other elements. The halide solid electrolyte exhibits high ion conductivity.

In the composition formula (2), M may include Y (=yttrium). That is, the halide solid electrolyte included in the solid electrolyte layer 202 may include Y as a metal element.

The halide solid electrolyte including Y may be a compound represented by the following composition formula (3).

$$\mathrm{Li}_a \mathrm{M}_b \mathrm{Y}_c \mathrm{X}_6 \qquad\qquad \text{Formula (3)}$$

In the composition formula (3), a+mb+3c=6 and c>0 are satisfied. In the composition formula (3), M includes at least one element selected from the group consisting of metalloid elements and metal elements other than Li and Y. The symbol m is the valence of M. The symbol X includes at least one selected from the group consisting of F, Cl, Br, and I. The symbol M includes at least one selected from the group consisting of Mg, Ca, Sr, Ba, Zn, Sc, Al, Ga, Bi, Zr, Hf, Ti, Sn, Ta, and Nb. As the halide solid electrolyte including Y can be used, specifically, $\mathrm{Li}_3\mathrm{YF}_6$, $\mathrm{Li}_3\mathrm{YCl}_6$, $\mathrm{Li}_3\mathrm{YBr}_6$, $\mathrm{Li}_3\mathrm{YI}_6$, $\mathrm{Li}_3\mathrm{YBrCl}_5$, $\mathrm{Li}_3\mathrm{YBr}_3\mathrm{Cl}_3$, $\mathrm{Li}_3\mathrm{YBr}_5\mathrm{Cl}$, $\mathrm{Li}_3\mathrm{YBr}_5\mathrm{I}$, $\mathrm{Li}_3\mathrm{YBr}_3\mathrm{I}_3$, $\mathrm{Li}_3\mathrm{YBrI}_5$, $\mathrm{Li}_3\mathrm{YClI}_5$, $\mathrm{Li}_3\mathrm{YCl}_3\mathrm{I}_3$, $\mathrm{Li}_3\mathrm{YCl}_5\mathrm{I}$, $\mathrm{Li}_3\mathrm{YBr}_2\mathrm{Cl}_2\mathrm{I}_2$, $\mathrm{Li}_3\mathrm{YBrCl}_4\mathrm{I}$, $\mathrm{Li}_{2.7}\mathrm{Y}_{1.1}\mathrm{Cl}_6$, $\mathrm{Li}_{2.5}\mathrm{Y}_{0.5}\mathrm{Zr}_{0.5}\mathrm{Cl}_6$, $\mathrm{Li}_{2.5}\mathrm{Y}_{0.3}\mathrm{Zr}_{0.7}\mathrm{Cl}_6$, or the like.

The above configuration can further improve the power density of the solid-state battery 2000.

The solid electrolyte included in the solid electrolyte layer 202 may include a sulfide solid electrolyte. As the sulfide solid electrolyte, those described above for the first solid electrolyte 103 can be used.

The solid electrolyte included in the solid electrolyte layer 202 may include at least one selected from the group consisting of an oxide solid electrolyte, a polymer solid electrolyte, and a complex hydride solid electrolyte. As the oxide solid electrolyte, the polymer solid electrolyte, and the complex hydride solid electrolyte, those described above for the first solid electrolyte 103 can be used.

The solid electrolyte layer 202 may include only one solid electrolyte selected from the group consisting of the above solid electrolytes, or may include two or more solid electrolytes selected from the group consisting of the above solid electrolytes. The plurality of solid electrolytes have different compositions. For example, the solid electrolyte layer 202 may include the halide solid electrolyte and the sulfide solid electrolyte.

The solid electrolyte layer 202 may have a thickness of 1 μm or more and 300 μm or less. When the solid electrolyte layer 202 has a thickness of 1 μm or more, a short-circuit between the negative electrode layer 201 and the positive electrode layer 203 is less likely to happen. When the solid electrolyte layer 202 has a thickness of 300 μm or less, the solid-state battery 2000 can operate at a high power.

The positive electrode layer 203 contributes to operation of the solid-state battery 2000 as a counter electrode of the negative electrode layer 201.

The positive electrode layer 203 may include a material having properties of occluding and releasing metal ions (e.g., lithium ions), and includes, for example, a positive electrode active material. As the positive electrode active material, for example, a metal composite oxide, a transition metal fluoride, a polyanion material, a fluorinated polyanion material, a transition metal sulfide, a transition metal oxysulfide, or a transition metal oxynitride can be used. In particular, when a lithium-containing transition metal oxide is used as the positive electrode active material, it is possible to reduce the manufacturing cost and increase the average discharge voltage.

The metal composite oxide selected as the positive electrode active material included in the positive electrode layer 203 may include Li and at least one element selected from the group consisting of Mn, Co, Ni, and Al. Examples of such a material include Li(NiCoAl)O$_2$, Li(NiCoMn)O$_2$, and LiCoO$_2$. For example, the positive electrode active material may be Li(NiCoMn)O$_2$.

The positive electrode layer 203 may include a solid electrolyte. This configuration can increase the lithium ion conductivity in the positive electrode layer 203 and allows the solid-state battery 2000 to operate at a high power. The materials described as examples of the solid electrolyte included in the solid electrolyte layer 202 may be used as the solid electrolyte of the positive electrode layer 203.

Particles of the active material included in the positive electrode layer 203 may have a median size of 0.1 μm or more and 100 μm or less. When the particles of the active material have a median size of 0.1 μm or more, the active material particle and the solid electrolyte can be in a favorable dispersion state. This improves the charging capacity of the solid-state battery 2000. When the particles of the active material have a median size of 100 μm or less, the diffusion rate of lithium in the particles of the active material is sufficiently ensured. This allows the solid-state battery 2000 to operate at a high power.

The median size of the particles of the active material may be greater than the median size of particles of the solid electrolyte. In this case, the active material and the solid electrolyte can be in a favorable dispersion state.

For a mass ratio "w2:100−w2" between the active material and the solid electrolyte included in the positive electrode layer 203, 40≤w2≤90 may be satisfied. When 40≤w2 is satisfied, the solid-state battery 2000 has a sufficient energy density. When w2≤90 is satisfied, the solid-state battery 2000 can operate at a high power.

The positive electrode layer 203 may have a thickness of 10 μm or more and 500 μm or less. When the positive electrode layer 203 has a thickness of 10 μm or more, the solid-state battery 2000 has a sufficient energy density. When the positive electrode layer 203 has a thickness of 500 μm or less, the solid-state battery 2000 can operate at a high power.

At least one selected from the group consisting of the negative electrode layer 201, the solid electrolyte layer 202, and the positive electrode layer 203 may include a binder to improve the adhesion between the particles. The binder is used, for example, to improve the binding properties of the material of an electrode. Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. As the binder can be used a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more materials selected from these may also be used as the binder.

At least one of the negative electrode layer 201 and the positive electrode layer 203 may include a conductive additive to increase the electronic conductivity. As the conductive additive can be used, for example, graphites such as natural graphite and artificial graphite; carbon blacks such as acetylene black and ketjen black; conductive fibers such as a carbon fiber and a metal fiber; metal powders such as a fluorinated carbon powder and an aluminum powder; conductive whiskers such as a zinc oxide whisker and a potassium titanate whisker; conductive metal oxides such as titanium oxide; and conductive polymer compounds such as polyaniline, polypyrrole, and polythiophene. Using a conductive carbon additive can seek cost reduction.

The solid-state battery 2000 can be batteries in various shapes, such as coin-type, cylindrical-type, prismatic-type, sheet-type, button-type, flat-type, and layer-built-type batteries.

EXAMPLES

Hereinafter, the details of the present disclosure will be described with reference to examples and comparative examples. The present disclosure is not limited to the following examples.

Example 1

[Production of Solution Containing Sulfide Solid Electrolyte]

Li$_2$S, P$_2$S$_5$, and super dehydrated tetrahydrofuran (THF) were mixed in an argon glove box having an Ar atmosphere having a dew point of −60° C. or lower. A molar ratio between Li$_2$S and P$_2$S$_5$ was 3:1. The THF did not include a stabilizer. The resulting mixture was stirred overnight to obtain a THF suspension containing Li$_3$PS$_4$.

Next, Li$_2$S and LiCl were dissolved in a super dehydrated ethanol (EtOH) to obtain an EtOH solution. A molar ratio between Li$_2$S and LiCl was 1:1. Then, the THF suspension and the EtOH solution were mixed to obtain a THF-EtOH solution containing Li$_6$PS$_5$Cl. In this solution, a molar ratio between Li$_2$S, P$_2$S$_5$, and LiCl used as raw materials was 5:1:2. The concentration of Li$_6$PS$_5$Cl in this solution was 4.5 mass %.

[Combination of Graphite Particle and Solid Electrolyte]

Next, a spherical graphite particle having voids inside was prepared. The graphite particle had a median size of 8 μm. The graphite particle had an average void size, determined by the mercury intrusion method, of 190 nm. In an argon glove box, the graphite particle and the THF-EtOH solution containing Li$_6$PS$_5$Cl were weighed at a mass ratio of graphite particle:Li$_6$PS$_5$Cl=97.5:2.5. These were then mixed in an agate mortar to bring the graphite particle and the THF-EtOH solution into contact with each other. Furthermore, the graphite particle and the THF-EtOH solution were kneaded to volatilize a solvent contained in the THF-EtOH solution. The resulting composite was subjected to a heating treatment at 150° C. for 2 hours under vacuum atmosphere to obtain a negative electrode active material. The negative electrode active material included Li$_6$PS$_5$Cl as a solid electrolyte.

[Production of sulfide solid electrolyte A for production of secondary battery] Li$_2$S and P$_2$S$_5$ were weighed in an argon glove box having an Ar atmosphere having a dew point of −60° C. or lower. A molar ratio between Li$_2$S and P$_2$S$_5$ was 75:25. These were crushed and mixed in a mortar. Next, milling was performed at 510 rpm for 10 hours using a planetary ball mill (Type P-7 manufactured by Fritsch GmbH) to obtain a glassy solid electrolyte. The glassy solid electrolyte was heat-treated at 270° C. in an inert atmosphere for 2 hours. Li$_2$S—P$_2$S$_5$, which is a sulfide solid electrolyte A in the form of a glass ceramic, was thereby obtained.

[Production of Positive Electrode Material B for Positive Electrode Layer]

A positive electrode active material Li(NiCoMn)O$_2$ (hereinafter referred to as "NCM") and the sulfide solid electrolyte A were weighed in an argon glove box having an Ar atmosphere having a dew point of –60° C. or lower. A mass ratio between NCM and the sulfide solid electrolyte A was 85:15. These were mixed in an agate mortar to produce a positive electrode material B.

[Production of Negative Electrode Material C for Negative Electrode Layer]

The above negative electrode active material and the sulfide solid electrolyte A were weighed in an argon glove box having an Ar atmosphere having a dew point of –60° C. or lower. A mass ratio between the negative electrode active material and the sulfide solid electrolyte A was 85:15. These were mixed in an agate mortar to produce a negative electrode material C.

[Production of Secondary Battery]

First, 80 mg of the sulfide solid electrolyte A and 20 mg of the positive electrode material B were weighed out and put in an insulating outer cylinder. The contents were compression-molded at a pressure of 720 MPa to produce a positive electrode layer and a solid electrolyte layer.

Next, the negative electrode material C was weighed to 19.5 mg. The negative electrode material C was put in the insulating outer cylinder such that the negative electrode material C was in contact with a surface of the solid electrolyte layer, the surface being located opposite a surface in contact with the positive electrode layer. The contents were compression-molded at a pressure of 360 MPa to produce a laminate formed of the negative electrode layer, the solid electrolyte layer, and the positive electrode layer.

Then, stainless steel current collectors were disposed on the top and bottom of the laminate, and a current collector lead was fixed to each current collector.

Finally, the insulating outer cylinder was sealed using an insulating ferrule to isolate the inside of the insulating outer cylinder from the outside atmosphere. A solid-state battery of Example 1 was produced in this manner.

Example 2

A solid-state battery of Example 2 was obtained in the same manner as in Example 1, except that in production of a negative electrode active material, the graphite particle and the THF-EtOH solution containing Li$_6$PS$_5$Cl were weighed at a mass ratio of graphite particle:Li$_6$PS$_5$Cl=95.0:5.0.

Example 3

A solid-state battery of Example 3 was obtained in the same manner as in Example 1, except that in production of a negative electrode active material, LiBr was used instead of LiCl. The negative electrode active material of the solid-state battery of Example 3 included Li$_6$PS$_5$Br as a solid electrolyte.

Example 4

A solid-state battery of Example 4 was obtained in the same manner as in Example 1, except that in production of a negative electrode active material, the graphite particle and the THF-EtOH solution containing Li$_6$PS$_5$Cl were weighed at a mass ratio of graphite particle:Li$_6$PS$_5$Cl=88.0:12.0.

Comparative Example 1

A solid-state battery of Comparative Example 1 was obtained in the same manner as in Example 1, except that in production of a negative electrode active material, a plate-like graphite particle having no void having a void size of 1 nm or more was used. The graphite particle used in Comparative Example 1 had a median diameter of 3 μm.

Comparative Example 2

A solid-state battery of Comparative Example 2 was obtained in the same manner as in Example 1, except that in production of a negative electrode active material, a THF suspension containing Li$_3$PS$_4$ was used instead of the THF-EtOH solution containing Li$_6$PS$_5$Cl and the graphite particle and the THF suspension containing Li$_3$PS$_4$ were weighed at a mass ratio of graphite particle:Li$_3$PS$_4$=97.5:2.5.

Comparative Example 3

A solid-state battery of Comparative Example 3 was obtained in the same manner as in Example 1, except that the graphite particle was not combined with a solid electrolyte and was directly used as a negative electrode active material.

[SEM Observation of Cross-Section of Particle]

Figure 4:
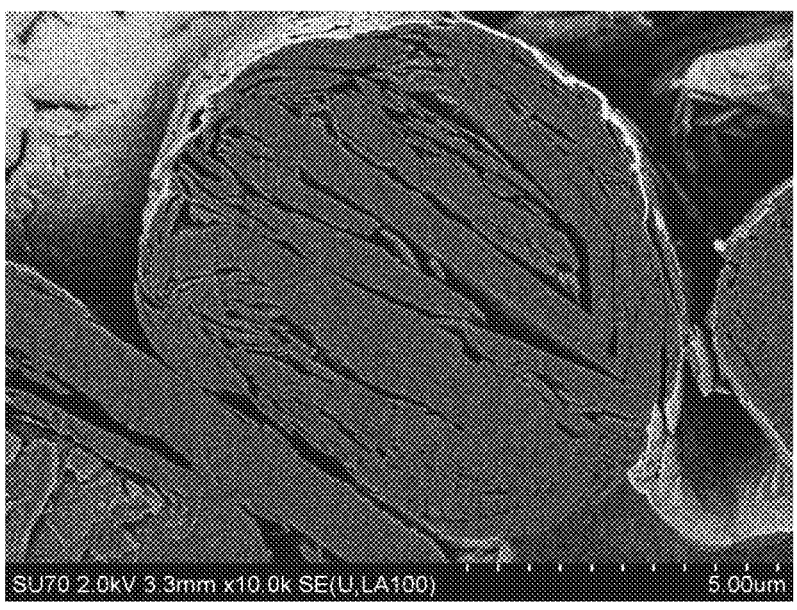
FIG. 4 is a scanning electron microscope (SEM) image of a cross-section of a graphite particle as used in Example 1.

A cross-section of a graphite particle as used in Example 1 was observed using a SEM (SU-70 manufactured by Hitachi High-Technologies Corporation). FIG. 4 is a SEM image showing the cross-section of the graphite particle as used in Example 1. As can be seen from FIG. 4, the graphite particle was an aggregate of plate-like primary particles that can form an intercalation compound including carbon. The graphite particle had voids between the plurality of primary particles.

Figure 5:
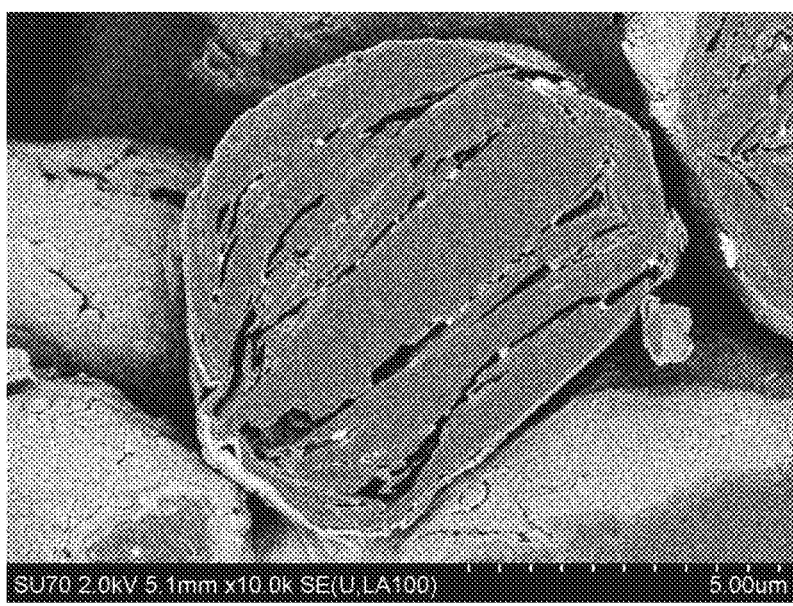
FIG. 5 is a SEM image showing a cross-section of a negative electrode active material produced in Example 1.

Next, a cross-section of the negative electrode active material as produced in Example 1 was observed with a SEM. FIG. 5 is a SEM image showing the cross-section of the negative electrode active material as produced in Example 1. As can be seen from FIG. 5, in the negative electrode active material, a deposit (a white portion) of the solid electrolyte was present in the voids inside the graphite particle.

[Evaluation of Solid-State Batteries of Examples 1 to 4 and Comparative Examples 1 to 3]

Figure 6:
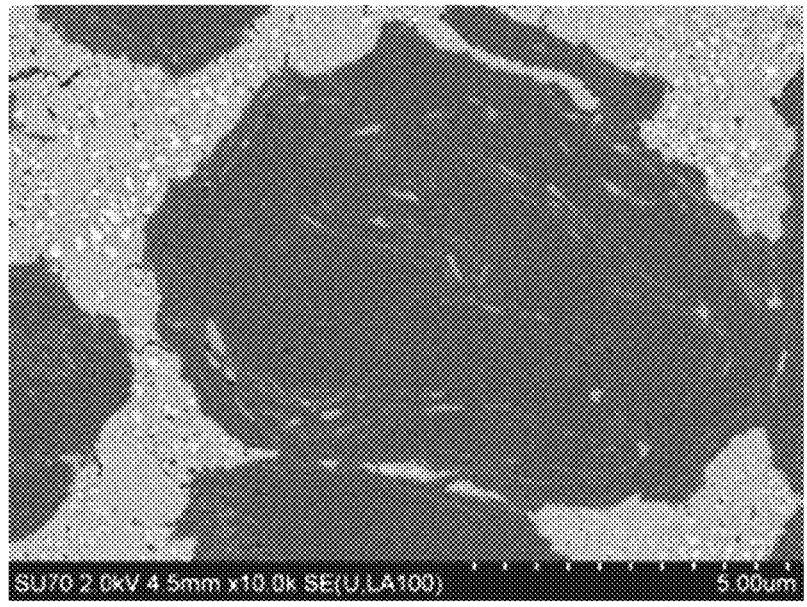
FIG. 6 is a SEM image showing a cross-section of a negative electrode active material included in a negative electrode layer of a solid-state battery of Example 1.

Cross-sections of the negative electrode layers of the solid-state batteries of Examples 1 to 4 and Comparative Examples 1 to 3 were observed with a SEM. FIG. 6 is a SEM image showing a cross-section of the negative electrode active material included in the negative electrode layer of the solid-state battery of Example 1. As can be seen from FIG. 6, in the negative electrode active material, a deposit (a white portion) of the solid electrolyte was present in the void inside the graphite particle. The deposit was subjected to element analysis by EDS. P, S, and Cl derived from Li$_6$PS$_5$Cl were present in the deposit.

For each of the solid-state batteries of Examples 1 to 4 and Comparative Examples 1 to 3, whether the solid electrolyte was present in the void of the graphite particle in the negative electrode active material was determined using the SEM image of the cross-section of the negative electrode layer. Table 1 shows the results. In Table 1, "presence" means that the solid electrolyte was present in the void of the graphite particle. "Absence" means that the solid electrolyte was not present in the void of the graphite particle or that no void was present inside the graphite particle.

Moreover, the shortest diameter of the void, in which the solid electrolyte was present, of the graphite particle was determined using the SEM image of the cross-section of the negative electrode layer. Table 1 shows the results. In the case where the SEM image shows a plurality of the voids, Table 1 shows the shortest diameter that is greatest of the shortest diameters of the plurality of voids shown.

In Examples 1 to 4, every void of the graphite particle was filled with the solid electrolyte. Therefore, in Examples 1 to 4, the shortest diameter of each void can be considered the shortest diameter of the solid electrolyte in the void.

The negative electrode layer of the solid-state battery of each of Examples 1 to 4 and Comparative Examples 1 to 3 were subjected to element analysis by EDS to examine whether the solid electrolyte used to produce the negative electrode active material was present outside the negative electrode active material. For example, whether Cl or Br derived from the solid electrolyte used to produce the negative electrode active material was present outside the negative electrode active material was examined for Examples 1 to 4 and Comparative Example 1. Table 1 shows the results.

The solid-state batteries of Examples 1 to 4 and Comparative Examples 1 to 3 were subjected to a charging test under the following conditions.

First, each solid-state battery was disposed in a constant-temperature chamber at 25° C. Constant current charge was performed for the solid-state battery under a pressure of 150 MPa applied by a pressurizing jig. The constant current charge was performed at a C-rate of 0.05 C, 0.7 C, or 1 C (one hour rate) with respect to a theoretical capacity of the solid-state battery. On the basis of the obtained results, a rate of a charging capacity of the battery at a C-rate of 1 C to a charging capacity of the battery at a C-rate of 0.05 C was calculated. Additionally, whether an electric potential disturbance occurred in constant current charging was examined at each rate. Table 1 shows the results. In Table 1, "yes" means that an electric potential variation in a wave form and with an amplitude of 0.02 V or more was confirmed during the constant current charging. "No" means that an electric potential variation as described above was not confirmed.

electrode active material. These results reveal that in Examples 1 to 3, the sulfide solid electrolyte A inside the negative electrode layer was sufficiently in contact with the graphite particle of the negative electrode active material.

In Comparative Example 1, the solid electrolyte was not present inside the graphite particle because the graphite particle did not have a void. In Comparative Example 1, the solid electrolyte used to produce the negative electrode active material deposited on the outer surface of the graphite particle.

In Comparative Example 2, the THF suspension used in the production of the negative electrode active material contained $Li_3PS_4$ as solids. Therefore, $Li_3PS_4$ was not introduced into the void of the graphite particle and the solid electrolyte was not formed in the void of the graphite particle.

Furthermore, in Comparative Examples 2 and 3, deformation of the negative electrode active material in the production of the negative electrode layer resulted in disappearance of the void of the graphite particle. The shortest diameter of the void was therefore unable to be measured for Comparative Examples 2 and 3.

For the solid-state batteries of Examples 1 to 4, an electric potential disturbance did not occur by charging at a C-rate of 0.7 C. In particular, for the solid-state batteries of Examples 1 to 3, an electric potential disturbance did not occur even by charging at a C-rate of 1 C. On the other hand, for the solid-state batteries of Comparative Examples 1 to 3, an electric potential disturbance did not occur by charging at a C-rate of 0.05 C, but an electric potential disturbance occurred by charging at a C-rate of 0.7 C. Moreover, each of the solid-state batteries of Examples 1 to 4 had a higher rate of the charging capacity of the battery at a C-rate of 1 C to the charging capacity of the battery at a C-rate of 0.05 C than those of the solid-state batteries of Comparative Examples 1 to 3. As described above, the solid-state batteries of

TABLE 1

| | Presence or absence of void of graphite particle | Solid electrolyte (*1) | Graphite particle:solid electrolyte (mas ratio) | Presence or absence of solid electrolyte in void | Shortest diameter of void (nm) | Presence or absence of solid electrolyte outside negative electrode active material (*2) | Rate between charging capacities (*3) | Charging electric potential disturbance 0.05 C | 0.7 C | 1 C |
|---|---|---|---|---|---|---|---|---|---|---|
| Example 1 | Presence | Li₆PS₅Cl | 97.5:2.5 | Presence | 23 | Absence | 67% | No | No | No |
| Example 2 | Presence | Li₆PS₅Cl | 95.0:5.0 | Presence | 40 | Absence | 70% | No | No | No |
| Example 3 | Presence | Li₆PS₅Br | 97.5:2.5 | Presence | 26 | Absence | 66% | No | No | No |
| Example 4 | Presence | Li₆PS₅Cl | 88.0:12.0 | Presence | 60 | Presence | 63% | No | No | Yes |
| Comparative Example 1 | Absence | Li₆PS₅Cl | 97.5:2.5 | Absence | — | Presence | 45% | No | Yes | Yes |
| Comparative Example 2 | Presence | Li₃PS₄ | 97.5:2.5 | Absence | — | Presence | 49% | No | Yes | Yes |
| Comparative Example 3 | Presence | N/A | 100:0 | Absence | — | Absence | 52% | No | Yes | Yes |

(*1) The type of the solid electrolyte used to produce the negative electrode active material
(*2) Whether the solid electrolyte used to produce the negative electrode active material is present outside the negative electrode active material
(*3) The rate of the charging capacity of the battery at a C-rate of 1 C to the charging capacity of the battery at a C-rate of 0.05 C In the negative electrode active material of the solid-state battery of each of Examples 1 to 4, the solid electrolyte was present in the void of the graphite particle. In particular, in the negative electrode active material of the solid-state battery of each of Examples 1 to 4, the solid electrolyte having a shortest diameter of 70 nm or less was present in the void of the graphite particle. Moreover, in Examples 1 to 3, the solid electrolyte used to produce the negative electrode active material was not present outside the negative Examples 1 to 4 had better rate characteristics than those of the solid-state batteries of Comparative Examples 1 to 3.

It is inferred that for the negative electrode layer of the solid-state battery of each of Comparative Examples 1 to 3, lithium ions supplied to the graphite particle at a high rate were not inserted into the graphite particle, and consequently lithium metal deposited near the electrode layer. It is inferred that in the negative electrode active material of the solid-state battery of each of Examples 1 to 4, lithium ions were easily inserted into the graphite particle because the solid electrolyte was present inside the graphite particle.

The charging capacity rates of Comparative Examples 1 and 2 were lower than that of Comparative Example 3. This can be attributed to the following factors. First, for Comparative Examples 1 and 2, the solid electrolyte used in the production of the negative electrode active material had a lower ionic conductivity than that of the solid electrolyte mixed in the negative electrode layer. Moreover, for Comparative Examples 1 and 2, the solid electrolyte used in the production of the negative electrode active material deposited not in the negative electrode active material but on the outside of the negative electrode active material. It is inferred that for Comparative Examples 1 and 2, the presence of the solid electrolyte having a relatively low ionic conductivity around the negative electrode active material reduced the performance of ion transport to the negative electrode active material.

INDUSTRIAL APPLICABILITY

The solid-state battery of the present disclosure can be used, for example, as an all-solid-state lithium secondary battery.

What is claimed is:

1. A solid-state battery comprising:
   a negative electrode layer including a negative electrode active material;
   a positive electrode layer; and
   a solid electrolyte layer positioned between the positive electrode layer and the negative electrode layer, wherein
   the negative electrode active material includes:
       graphite particles, each of which is an aggregate of a plurality of primary particles including graphite and has a void inside; and
       a solid electrolyte disposed inside the void of each of the graphite particles, the graphite particles have a median size of 300 nm or more and 30 μm or less, at least a portion of the void is filled with the solid electrolyte,
   the void has a minimum diameter of 1 nm or more and 70 nm or less, and
   wherein an outer surface of each of the graphite particles is partially covered by a solid electrolyte made of a same material as the solid electrolyte disposed inside the void of each of the graphite particles with a coating rate of 10% or less, and the coating rate is determined by:
       observing the outer surface of each of the graphite particles using a scanning electron microscope to obtain an image;
       calculating by using image processing on the image, a first area of each of the graphite particles and a second area of the solid electrolyte; and
       calculating a ratio of the second area to the first area as the coating rate.

2. The solid-state battery according to claim 1, wherein
   the plurality of primary particles each have a shape of a plate or a flake, and
   the plurality of primary particles are laid one upon another in each of the graphite particles.

3. The solid-state battery according to claim 1, wherein the solid electrolyte disposed inside the void of each of the graphite particles includes lithium, phosphorous, sulfur, and halogen.

4. The solid-state battery according to claim 1, wherein the solid electrolyte disposed inside the void of each of the graphite particles is represented by the following compositional formula (1):

$$Li_\alpha PS_\beta X_\gamma \hspace{3cm} \text{Formula (1),}$$

where $\alpha$, $\beta$, and $\gamma$ satisfy $5.5 \le \alpha \le 6.5$, $4.5 \le \beta \le 5.5$, and $0.5 \le \gamma \le 1.5$, and X includes at least one selected from the group consisting of F, Cl, Br, and I.

5. The solid-state battery according to claim 1, wherein the solid electrolyte disposed inside the void of each of the graphite particles has an argyrodite crystal structure.

6. The solid-state battery according to claim 1, wherein the negative electrode layer further includes a solid electrolyte having a composition different from a composition of the solid electrolyte disposed inside the void of each of the graphite particles included in the negative electrode active material.

7. The solid-state battery according to claim 1, wherein the solid electrolyte layer includes a solid electrolyte having lithium ion conductivity.

8. The solid-state battery according to claim 1, wherein the solid electrolyte disposed inside the void of each of the graphite particles is a film of a deposit deposited inside the void and coating an inner surface of the void.

9. The solid-state battery according to claim 1, wherein
   each of the plurality of primary particles is a graphite flake or a graphite plate, and
   the void is located between two of the plurality of primary particles inside each of the graphite particles.

10. The solid-state battery according to claim 1, wherein
    each of the graphite particles has a plurality of voids inside, the void being one of the plurality of voids, and
    an average void size, determined by a mercury intrusion method, of the graphite particles is 1 nm or more and 300 nm or less.

11. The solid-state battery according to claim 10, wherein
    the average void size is 150 nm or more and 200 nm or less.

12. The solid-state battery according to claim 1, wherein
    the median size of the graphite particles is 1 μm or more and 10 μm or less.

* * * * *